Jan. 27, 1925.
R. C. RUSSELL
COMBINED FENDER BRACE AND HEADLIGHT SUPPORT
Filed Dec. 3, 1923
1,524,109
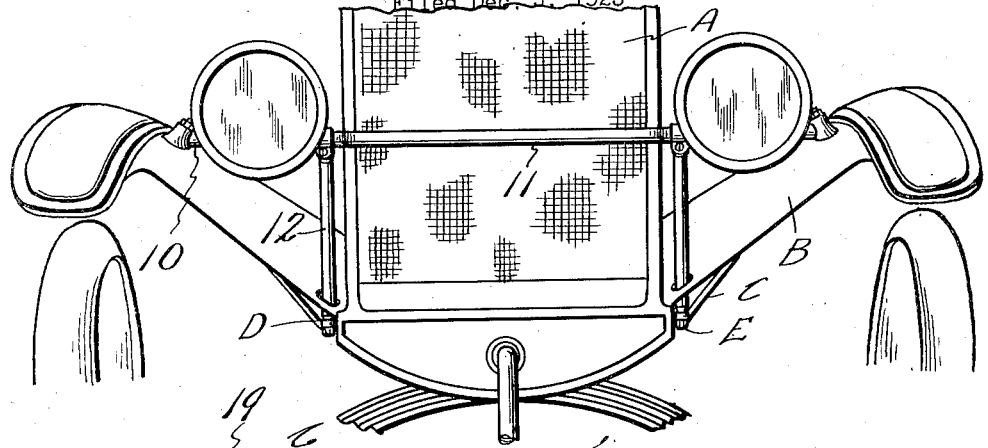
Fig.1
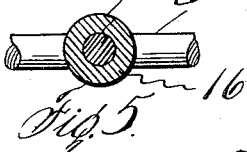
Fig.5
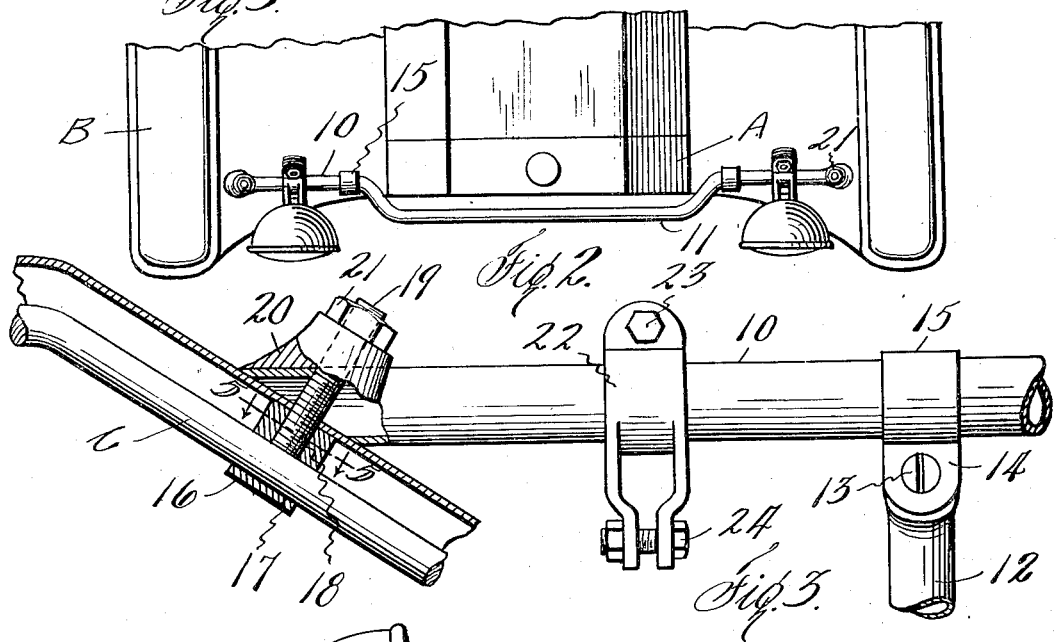
Fig.2
Fig.3
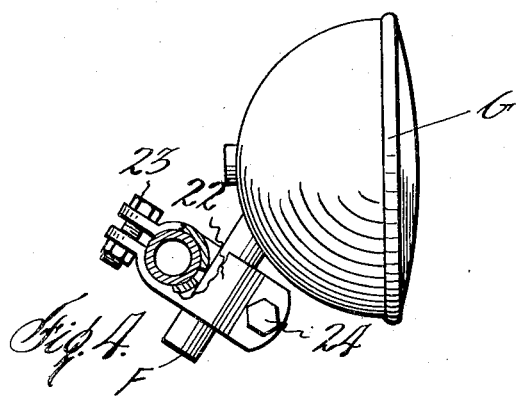
Fig.4
Inventor
R. C. Russell
By Jack A. Schley
Attorney Patented Jan. 27, 1925.

1,524,109

UNITED STATES PATENT OFFICE.

ROBERT C. RUSSELL, OF DALLAS, TEXAS, ASSIGNOR TO LUTHER K. AUTRY, OF DALLAS, TEXAS.

COMBINED FENDER BRACE AND HEADLIGHT SUPPORT.

Application filed December 3, 1923. Serial No. 678,182.

*To all whom it may concern:*

Be it known that I, ROBERT C. RUSSELL, a citizen of the United States of America, residing at Dallas, in the county of Dallas and State of Texas, have invented certain new and useful Improvements in Combined Fender Braces and Headlight Supports, of which the following is a specification.

This invention relates to new and useful improvements in combined fender braces and headlight supports.

The object of the invention is to provide a fender brace for the front fenders which will not detract from the appearance of the car and which may be readily applied to certain types of cars in a novel manner.

A particular object is to provide a fender brace including a single transverse element, stayed by vertical members and efficiently attached to the fenders and fender supports in a simple and attractive manner.

A further object is to provide a front fender brace which serves as a headlight support together with means for adjustably supporting the headlights.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is a fragmentary view of the front of an automobile of the Ford type equipped with a fender brace and headlight support constructed in accordance with my invention, Fig. 2 is a plan view of the same, Fig. 3 is an enlarged detail of one end of the brace showing the manner of attaching to a fender support, Fig. 4 is a side elevation of the headlight mounting, and Fig. 5, is a cross-section on the line 5—5 of Fig. 4.

In the drawings the numeral 10 designates a transverse cross member or rod which is preferably tubular in order to give strength without undue weight. This rod is bent intermediate its ends so as to provide a central bow or offset 11, which as is best shown in Fig. 2, receives the front of the radiator A. This permits the extension or shanks of the brace to overlie the front edges of the fenders B and the fender supports or brackets C. The brackets C have an eye D for receiving the posts of the headlight, which posts are removed when any brace is applied.

At each side of the radiator an upright brace standard 12 is substituted for the headlight post and its lower end reduced and screw threaded so as to be inserted through the eye D and fastened with the same nut E as was used in fastening the headlight. Each standard has its upper end flattened and pierced to receive a screw-bolt 13 passing through the depending ears 14 of a clamp collar 15 mounted on the rod 10. The upper end of each standard is received between the ears of the adjacent clamp collar which is of such diameter as to be frictionally held on the rod when the bolt 13 is fastened. The standards act as vertical stays for the rod and hold it against movement in a vertical plane, as well as bracing it against horizontal movement.

The ends of the rod are beveled to fit on the surface of each fender apron as is shown in detail in Fig. 3. A stud block 16 has a transverse slot 17 for receiving the fender support C at each side of the automobile. The blocks are slipped onto the supports from the outer ends of the latter. As is shown in Fig. 3 the block has sufficient length to extend from the support to the under side of the fender B. Each block has an axial screw-threaded bore 18 extending from its slot and receives a stud bolt 19 extending through the fender and the end of the rod 10.

At each side the stud bolt is screwed down onto the support C, whereby the block is fastened thereon. A truncated washer 20, mounted on each bolt 19 has its underside concaved to fit on the rod 10 and a nut 21 placed on the said bolt is screwed down onto the washer. By this means the ends of the rod are fastened to the fenders B and the supports C, and the fenders are not only braced against rocking, rattling and displacement, but the clamping of the same between the blocks 16 and the ends of the rod 10, stiffens the apron of the fenders and lends rigidity to the structure.

A very important feature is the mounting of the headlights. Where the headlights are mounted on posts fixed in the eyes D as is now the common practice it is pratically impossible for the driver to adjust the headlights or aline them if one of the posts are bent, which frequently occurs. Of course I am aware that headlights have been adjustably mounted before my invention, but no means has been devised such as I provide for Ford cars and the like. On the shank at the end of rod 10 and between the washer 20 and the collar 15 I mount a double clamp 22 each having sockets at right angles to each other. Each clamp 22 has a rear bolt 23 and embraces the rod 10 to which it is fastened by said bolt. The post F of each headlight G, is cut off, as is shown in Fig. 4, and inserted in the clamp and fastened by a front bolt 24.

In order to hold the headlights in a perpendicular position, the clamps 22 are inclined on the rod, but by loosening the bolts 23 the lights may be adjusted in a vertical arc, as desired. By tilting the headlights downwardly, the rays are thrown more in front of the car. This arrangement also spreads the headlights apart and gives a wider range than is had by the present mounting. Further the lights may be adjusted in a horizontal plane and any faulty adjustments thus corrected.

The cross rod with the standards 12 constitute a brace of great rigidity and improve rather than detract from the appearance of the car.

What I claim, is:

In a combined fender brace and headlight support, a transverse cross member, upright standards, means for immovably fastening the standards to an automobile frame, clamps for fastening the cross bar to the upper ends of the standards, the cross bar extending beyond the standards at each end, clamping devices for engagement with the fender braces under the fenders, clamp bolts carried by the clamping devices for extending through the fenders and passing through the ends of the cross member, nuts on the bolts for fastening the cross member to the fender braces, the clamping members being adjustable longitudinally of the fender braces.

In testimony whereof I affix my signature.

ROBERT C. RUSSELL